United States Patent Office 3,441,719
Patented Apr. 29, 1969

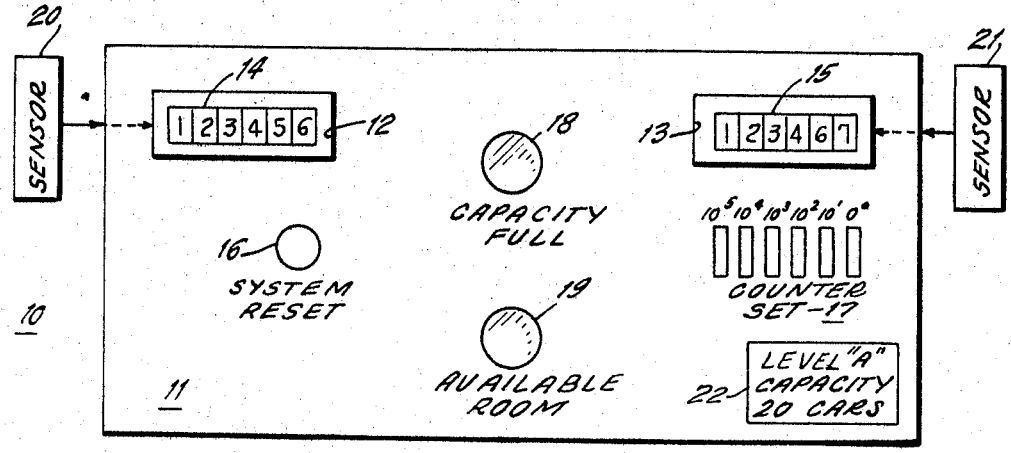
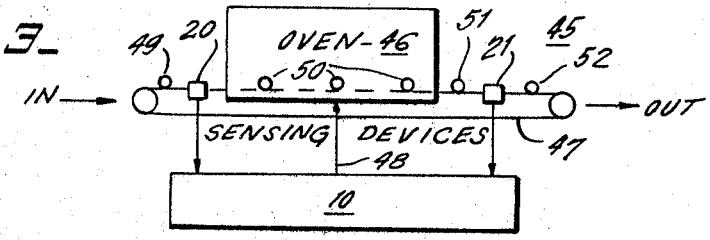
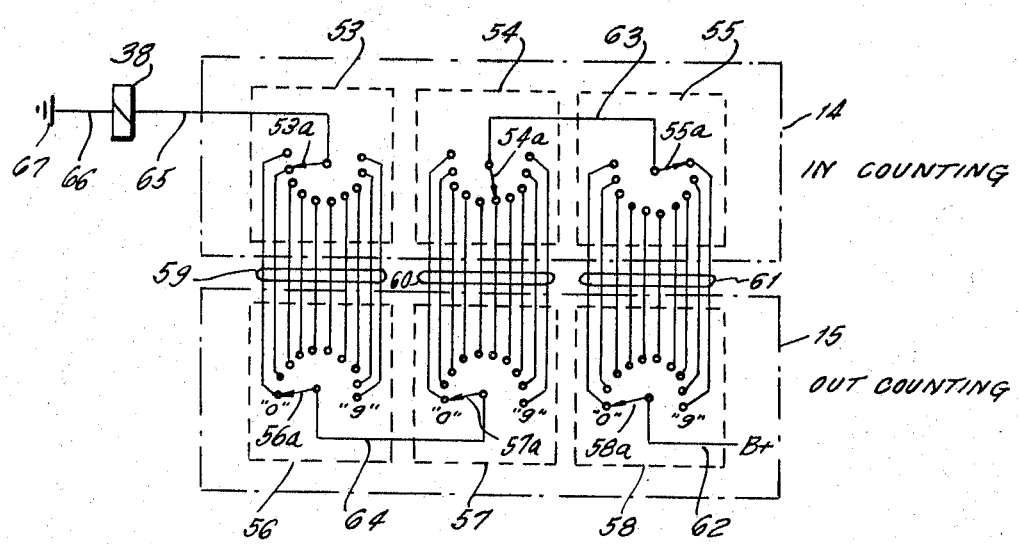

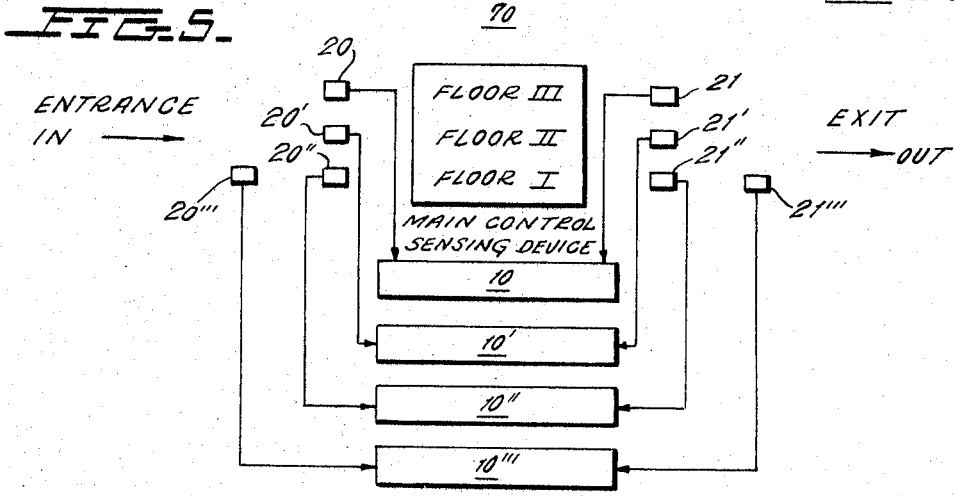
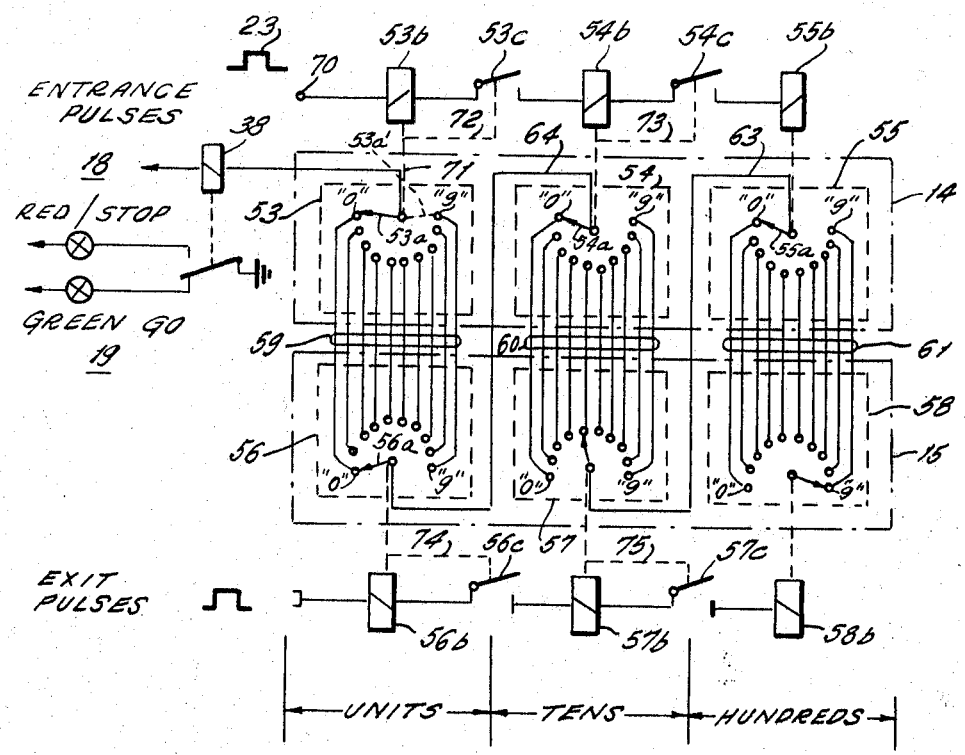

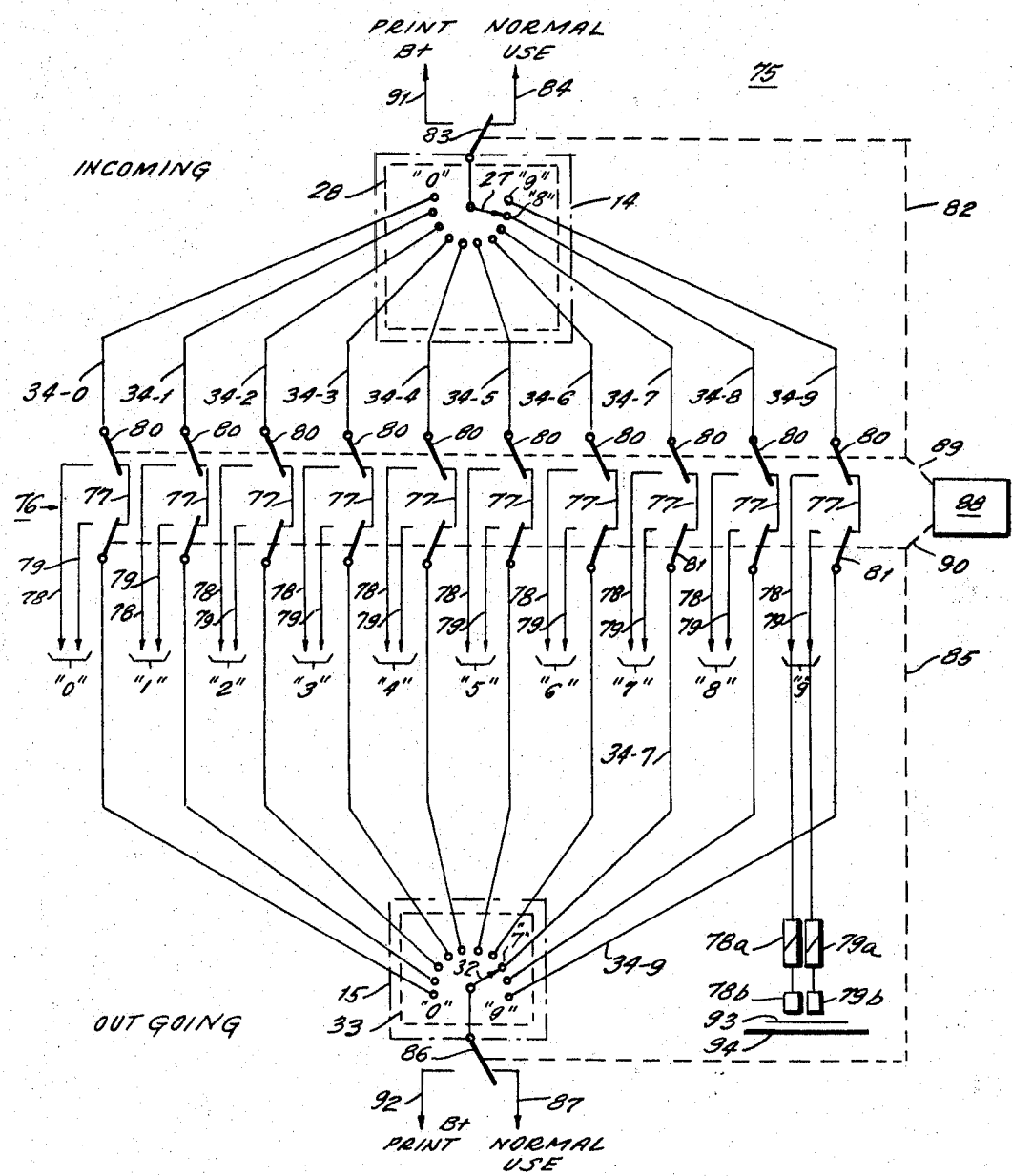

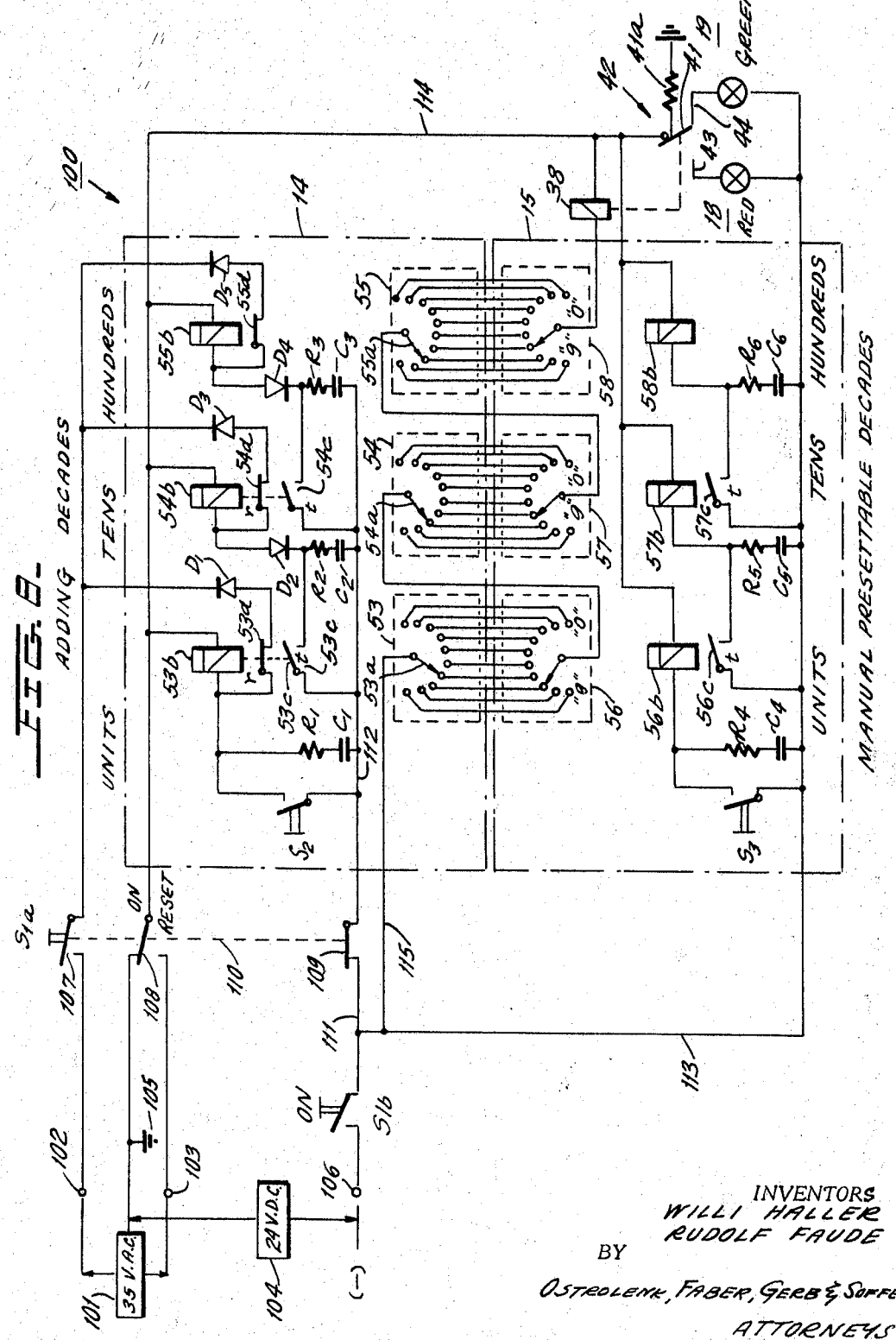

3,441,719
MONITORING MEANS
Willi Haller, Teaneck, and Rudolf Faude, Fort Lee, N.J., assignors, by mesne assignments, to Hecon Corporation, New Shrewsbury, N.J., a corporation of New Jersey
Filed Apr. 7, 1966, Ser. No. 541,004
Int. Cl. G06f 11/00, 7/38, 11/02
U.S. Cl. 235—92
16 Claims

ABSTRACT OF THE DISCLOSURE

A control device for monitoring the state or capacity of a machine or a parking lot, for example, A pair of forward stepping counters have their switch positions electrically interconnected. Each of the counter electro-magnets are operative under control of a sensing device to advance the total count of the reading and the associated switch positions. One of the counters may be preset to a predetermined reading which may indicate the capacity of the machine or of the parking area being monitored, for example. The incoming vehicles energize suitable sensing devices advancing the state of one of the counters. As soon as coincidence exists between the two counter readings and indication of capacity fault is generated. As cars leave the parking area, the present counter is advanced to upset the coincidence condition. Printout means may be provided, if desired.

---

The instant invention relates to monitoring devices, and more particularly to a novel monitoring device which is quite simple and inexpensive in design and operation, and which provides an immediate indication of unused capacity of the space or handling operation or process being monitored, as well as providing an audio-visual signal to indicate when capacity condition has been reached, and a second audio-visual signal to indicate that capacity has not yet been reached.

There are numerous instances in which it is desired to determine the unused capacity of a device, space or operation at a glance, and to further be provided with an indication of when capacity has been reached so that the deivce, space or operation will not be called upon again until some unusued portion of its capacity is again made available.

As one example of such an operation, let it be assumed that we desire to monitor each level of a multi-level parking garage as well as monitoring the entire garage through the use of simple and reliable monitoring means. For example, if the parking garage is comprised of ten or fifteen levels, we certainly wish to avoid attempting to park a vehicle at the top level only to find that this level is already filled to capacity. Also, once a level of the parking garage has been filled to capacity and has subsequently had one or more vehicles leave, it is extremely desirable to be able to indicate this condition in order to be aware that parking space has again become available on this level. In addition thereto, a study of the condition of each level can be made to compare all of the levels in order to ascertain why certain of the levels have been filled up while others still have a large number of available spaces to be used.

In order to perform such monitoring functions, it is obviously necessary to provide some mechanical, electro-mechanical or other suitable means to provide an indication or signal each time a vehicle enters a level of the parking garage, and to provide a second indication or signal each time a vehicle leaves that level of the parking garage. Such devices are well known in the art, and the particular device employed lends no novelty to the instant invention so long as the device opeartes to provide the necessary entering indication or signal and leaving indication or signal.

In order to preform such functions, we have conceived of a simple, inexpensive and yet extremely reliable system for providing the desirable functions referred to above.

The instant invention is comprised of first and second electromechanical counters, each being capable of providing counts of substantially the same magnitude such as, for example, 0 through 9; 00 through 99; 000 through 999; and so forth. The counter means providing the outgoing function is provided with manual setting means for setting up any desired count within this counter means. This desired count is typically the capacity of the parking level being monitored, the inventory control being monitored, the process being performed and so forth.

The counter means hereinafter referred to as the incoming counter is simply set to a 000 count. It should be understood that both counters are of a very simple design, and neither require any form of bidirectional stepping characteristics.

The device moinitoring entering automobiles is coupled to the incoming counter means so as to provide an advancing pulse for the incoming counter each time a vehicle enters the parking level being monitored. Likewise, the device which porvides an indication each time a vehicle leaves the parking level is electrically coupled to the outgoing counter so as to advance the count of the outgoing counter each time a vehicle leaves the parking level being monitored.

In order to provide an indication that the parking level being monitored is filled to capacity, each decade of the incoming and outgoing counters is provided with a stepping switch which is coupled to form a coincident circuit between associated decades (i.e., units, tens, hundreds, etc.) of the incoming and outgoing counters. For the sake of simplicity, let it be assumed that the parking level being monitored has a capacity of eight vehicles. The outgoing counter will then be comprised of at least a units decade position, and similarly, the incoming counter may have an identical number of decade positions. The stepping switch terminals of associated decades are coupled to form a coincident circuit between associated decades of the incoming and outgoing counters. All of the coincident circuits for each decade are then connected in electrical series with one another and further in electrical series with alarm means which provide a first alarm indication when capacity has not been reached and a second alarm indication when capacity has been reached.

Having set the outgoing conuter to the capacity of the parking level being monitored, namely, eight, the coincident circuit fails to indicate coincidence so as to operate the alarm means to provide an indication that the parking level being monitored has yet to reach capacity. As each vehicle enters the parking level being monitored, the sensing device operates the incoming counter to increase its total by 1. Assuming that no vehicles have left this parking level during the time in which eight vehicles have entered, the incoming and outgoing counters provide the identical reading, and the coincident circuit indicates coincidence, reversing the control of the alarm means to provide an indication that capacity has been reached. Such an audio-visual alarm immediately indicates to the attendant that no effort need be made to attenmpt to park vehicles at this parking level.

If, at any time, a vehicle leaves this parking level, a second sensing device operates the outgoing counter to increase its count by 1, thereby upsetting the concidence condition and reversing the alarm condition to indicate that space has again become available at this parking level. Simply by observing the total count on the outgoing and incoming counters and subtracting the reading of the incoming counter from the outgoing counter, the number of spaces available at the parking level being monitored can be immediately determined. In addition, the incoming counter provides an indication of the total number of cars which have been parked on this parking level per hour, per day, per week, or any other period of operation of the monitoring device before being reset. The total number of cars which have left the parking level during the monitoring period can be immediately ascertained by subtracting the capacity of the level being monitored from the reading of the outgoing register. Thus, through a knowledge of the number of spaces available, the total number of cars still occupying spaces on the level being monitored can also be readily and easily determined.

A separate monitoring device may be provided for each level within the multilevel parking garage, and if desired, an additional monitoring device may be provided for giving an indication of the availability of space for the entire garage. Thus, by arranging a bank of monitoring devices within a control panel, a service attendant, by observing the control panel, can immediately determine which level has available parking space and can immediately direct his assistants to a level having available space, thus avoiding the need for unnecessary cruising through the various levels of the parking garage before an available space is located.

Whereas the above exemplary embodiment has been described for use in a multilevel parking garage, it should be understood that the instant invention is by no means limited to a multilevel parking garage, but may be employed in a parking lot which is on a single level, but which covers a vast amount of territory divided into sections, whereby a separate monitoring device is provided for each section of the parking lot. In addition thereto, the monitoring device of the instant invention may be employed for production or inventory control. For example, in a restaurant, as each waiter places an order for hamburgers, for example, the incoming register is advanced for each order. As each hamburger is fed to the roasting or heating unit, the uotgoing register is advanced. As soon as there is coincidence between the counts of each register, no more hamburgers are fed into the heating unit. As additional orders are placed, upsetting the coincidence relationship, the alarm status is altered to indicate that the amount of food in preparation is less than the orders placed for that particular type of food. The alarm output may be electrically coupled to means for feeding food to the heating device, thereby making the system fully automatic. In this particular application, it can clearly be seen that it is not necessary to pre-set the outgoing register. However, if it is desired to operate the heating unit in the same manner as the parking garage previously described, wherein it is common to maintain a perdetermined amount of hamburgers or other food items on the fire even though no food order has been placed, then the outgoing register may be pre-set in the same manner as was previously described with reference to the parking level monitoring means. The device of the instant invention may also be employed for the purpose of monitoring machine tools, providing inventory control, item processing and other similar operations, depending wholly upon the needs of the user. The simplicity of the monitoring makes the use of the monitoring system for each level, machine, and the like, quite feasible, since the per unit cost of each individual monitoring system is quite small. The electromechanical counters of the monitoring system also have the distinct advantage of maintaining their totals at any given instant so that even if a momenary power failure should occur, the totals accumulated within the counters will not be lost or in any way affected. Also, the counting deivces employed do not require any bidirectional characteristics, thereby keeping their cost at an extremely low level.

It is, therefore, one object of the instant invention to provide a novel low-cost monitoring device for continuously monitoring the capacity of a device, area or operation to simply and readily ascertain whether the capacity condition of the device has been reached.

Another object of the instant invention is to provide a novel, low-cost monitoring device comprised of first and second counters, each being provided with a stepping switch for each decade thereof, and means forming a coincidence circuit between all of the associated decades of said first and second counters so as to provide a first indication that capacity has not been reached when there is no coincidence, and a second indication that capaicty has been reached when there is coincidence.

Yet another object of the instant invention is to provide a novel, low-cost monitoring device comprised of first and second counters, each being provided with a stepping switch for each decade thereof, and means forming a coincidence circuit between all of the associated decades of said first and second counters so as to provide a first indication that capacity has not been reached when there is no coincidence, and a second indication that capacity has been reached when there is coincidence, and further comprising alarm means to provide a visual and/or audio alarm for each of said position conditions.

These and other objetcs of the instant invention will become apparent when reading the accompanying description and drawings, in which:

FIGURE 1 is a schematic view showing one possible arrangement embodying the principles of the instant invention.

FIGURE 3 is a block diagram showing still another system in which the instant invention may be employed.

FIGURE 4 is a schematic diagram showing the manner in which three decades of the incoming and outgoing counters are electrically coupled FIGURE 5 is a block diagram showing another application of the instant invention.

FIGURE 6 is a schematic diagram similar to that shown in FIGURE 4 and further showing the pulsing and alarm circuitry.

FIGURE 7 is a schematic diagram showing the manner in which print-out circuitry may be coupled to each decade of the monitoring system.

FIGURE 8 is a schematic diagram showing a monitoring system having an A.C. reset.

Figure 2:
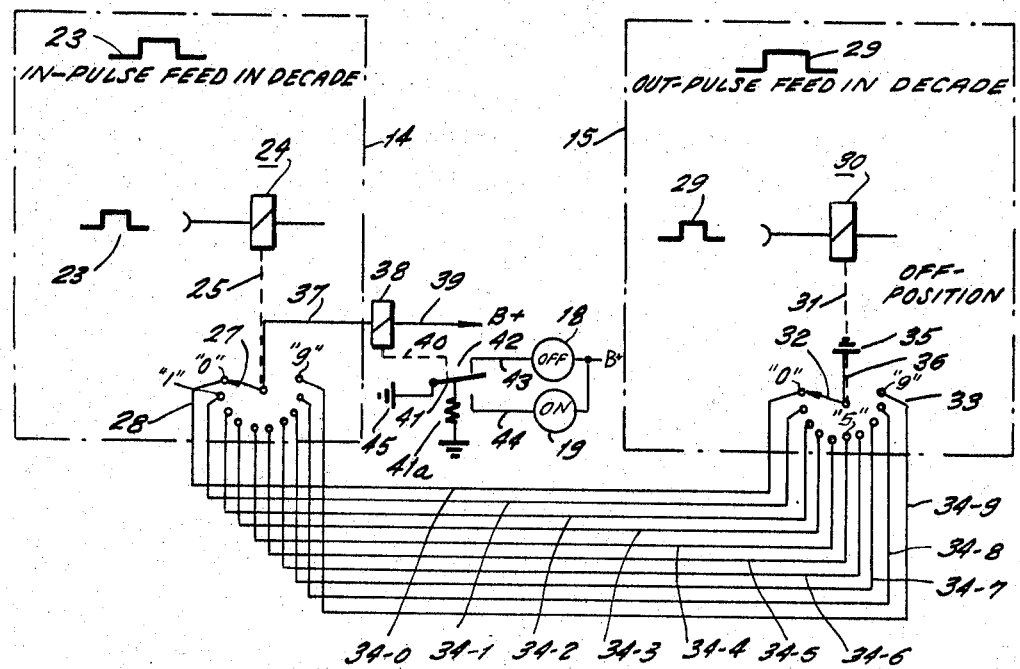
FIGURE 2 is a schematic diagram showing the electrical circuit between two decades of the monitoring system of FIGURE 1.

Referring now to the drawings, FIGURE 1 shows a monitoring system 10 designed in accordance with the principles of the instant invention, and which is comprised of a housing having a front panel 11 provided with first and second openings 12 and 13 behind which are mounted electromechanical counters 14 and 15, respectively. Each counter is provided with a plurality of windows behind which are mounted number-bearing wheels which are rotatable by the counter driving means (not shown) to present a visually observable reading representing the totalized count developed by the counter. For example, counter 14 shows a reading of 123,456, while counter 15 shows a reading of 123,467. Counter 14 will hereinafter be referred to as the "incoming" counter, and counter 15 will hereinafter be referred to as the "outgoing" counter for reasons that will hereinafter become obvious.

A system reset button 16 is provided for "erasing" and resetting either counter 14 or both counters 14 and 15 to zero readings. A counter set button 17 is provided, which button is manually operable to preset outgoing counter 15 to any desired reading for a purpose to be more fully described. Counter set button array 17 is preferably comprised of a plurality of set buttons for each decade of the counter so as to permit simple, rapid presetting of outgoing counter 15. For example, the right-handmost button of counter set button array 17 is the units button, the next button to the left is the tens-button, and so forth across the row from right to left.

The front panel 11 is further provided with visually observable panel lights 18 and 19 for indicating full capacity and available room, respectively. The operation of the system is such that only one of these panel lights will be lit an any given instant.

Incoming counter 14 is electrically coupled to a sensing device 20 which senses one phase of an activity being measured. Outgoing counter 15 is electrically coupled to a second sensing device 21 which senses another phase of the activity being measured. As one application of the system 10, shown in FIGURE 1, let it be assumed that we desire to monitor the flow of vehicles to one level of a multilevel storage garage. Sensing device 20 therby takes the form of either an electromechanical or electronic device which develops a pulse of suitable amplitude and pulse duration to advance the count of counter 14 by one unit each time a vehicle enters into the level being monitored. Sensing device 20, for example, may take the form of a pressure-operated plate over which the vehicles may ride. As another example, sensor 20 may take the form of a photocell or electric-eye device which develops a pulse of suitable magnitude and pulse duration to advance counter 14 by one unit each time a vehicle enters the storage level being monitored. The particular sensing device employed is dependent only upon the needs of the particular user and lends no novelty to the device of the instant invention, so long as it is capable of adequately sensing the entrance of a vehicle into the level being monitored.

In a like manner, the second sensing unit 21 takes the form of any of those devices described above and which have the capability of developing a pulse of sufficient magnitude and pulse duration to advance the count of counter 15 by one unit each time a vehicle departs from the level being monitored.

In a like manner, the second sensing unit 21 takes the form of any of those devices described above and which have the capability of developing a pulse of sufficient magnitude and pulse duration to advance the count of counter 15 by one unit each time a vehicle departs from the level being monitored.

The operation of system 10 is as follows:

Let it be assumed that the storage level of the storage garage being monitored has a storage capacity to receive twenty vehicles. The system reset button 16 is depressed so as to reset counter 14 or both counters 14 and 15 to provide zero readings in both. Outgoing counter 15 is then preset to provide a reading of 20 in its two right-handmost digits, i.e., the tens and units decades. It should be understood that in the example given herein, there is no necessity to provide counters 14 and 15 having a capacity to develop a total count of 1,000,000, and that counters developing a total count of 1,000 or even 100 (i.e., three decades or two decades, respectively), would be sufficient for the application given herein.

After having preset outgoing counter 15 to a reading of 20, the system is now ready for use. With the reading of outgoing counter 15 being greater than the reading of incoming counter 14 (which at this time has a reading of zero), available room panel light 19 will be lit, indicating that there is available room for vehicles on the storage level being monitored.

As each vehicle enters the storage level, sensing device 20 provides a pulse to advance the count of incoming counter 14 by a single unit for each incoming vehicle. So long as the count of counter 14 does not equal the count of outgoing counter 15, the available room panel light 19 will remain lit.

As a vehicle, or vehicles, leave the storage level being monitored, sensing device 21 will pulse outgoing counter 15, advancing the count of outgoing counter 15 by one unit for each vehicle departing from the storage level.

As one possible example, let it be assumed that, after presetting outgoing counter 15, ten vehicles enter the level being monitored. At this time, the readings are: incoming counter 10 and outgoing counter 20. In this state, the available room panel light 19 remains lit. Let it now be assumed that two vehicles depart. The readings then become: incoming counter 10 and outgoing counter 22. In this state, the available room panel light 19 is still lit. Let it now be assumed that ten more vehicles enter the level. This provides a reading 20 in incoming counter and 22 in the outgoing counter. Thus, even though the incoming counter 14 provides a reading which is identical to the actual capacity of the level being monitored, the available room panel light 19 nevertheless remains lit by virtue of the fact that the outgoing counter 15 has been advanced by two units to reflect the departure of two vehicles. Thus, so long as the reading of outgoing counter 15 exceeds the reading of incoming counter 14, the available room lamp 19 will remain lit. A simple subtraction of the reading in incoming counter 14 from the reading in outgoing counter 15 also indicates the number of spaces available at the level being monitored. The system 10 of FIGURE 1 is quite simple in the sense that no reversible counter means need be employed to provide the readings and lamp indications of the system of FIGURE 1.

Incoming counter 14 provides an indication of the total number of vehicles which have been parked at the level being monitored for a given period such as, for example, a day, week or month. Thus, the system need be reset only so often as is desired. The panel 11 may be provided with a template, label or other suitable sheet or plate 22 which may be mounted with an adhesive or with other fastening members and which indicates the capacity of the level being monitored. By subtracting the capacity indicated on plate 22 from the total of outgoing counter 15, this result indicates the total number of vehicles which have departed from the level. By subtracting this result from the total in incoming counter 14, this provides an immediate indication of the number of vehicles parked on the level being monitored at that given instant. Thus, through the simple arrangement of FIGURE 1, all of the information which may be desired regarding a level being monitored is simply and readily available through the use of a reliable and inexpensive system. The advantage of employing electromechanical counters resides in the fact that a temporary power failure will not erase or otherwise destroy the counts developed within the incoming and outgoing counters as may be the case with all electronic devices. Also, the circuitry employed is reduced to a minimum in that no reversible counter structures need be provided and the counters employed need be capable of advancing in only one direction.

FIGURE 2 shows the circuitry employed for obtaining the alarm indication described above for the case where incoming and outgoing counters are each provided with only one decade, i.e., the units decade. The incoming counter electronics is contained within the dotted box 14, and the outgoing counter electronics is contained wthin the dotted box 15. The in-pulse 23 represents the pulse generated by sensing device 20 each time a vehicle enters the level being monitored. This pulse 23 is impressed upon the counter advancing coil 24 to advance the count in incoming counter 14 by one unit. The advancing relay coil 24 is further coupled to the rotary arm 27 of a stepping switch 28. This mechanical coupling is represented by dotted line 25. The stepping switch 28 is provided with ten contacts numbered "0" through "9," each representing one decimal digit position. The normal setting of stepping switch 28, after reset of the system, is as shown in FIGURE 2 with the rotary arm 27 making electrical contact with the "0" terminal of the stepping switch. When the entrance of a vehicle is sensed, pulse 23 operates the relay coil 24 to advance the counter reading wheel by one unit, and likewise to advance rotary arm 27 by one position of stepping switch 28.

Outgoing counter 15 operates in substantially the identical manner wherein the sensing device 21 generates a pulse 24 each time a vehicle departs the storage level being monitored. The pulse 29 is impressed upon the counter stepping coil 30 which is mechanically coupled through a mechanical linkage 31 to the rotary arm 32 of a ten-position stepping switch 33. As was previously described, if desired, the outgoing counter may be preset to an amount to indicate the capacity of the level being monitored. Let it be assumed that in the example applicable to the arrangement of FIGURE 2 the storage capacity is five vehicles. Thus, the unit pushbutton for setting counter 15 would be depressed five times to set the counter numbers-bearing wheel (not shown) to yield a reading of 5, and would further simultaneously set the rotary arm 32 into electrical engagement with the "5" terminal of ten-position switch 33. The specific form of the electromechanical counter and stepping switches employed is not critical so long as the operation of the counter-wheels of the counter are synchronized and occur with the advancing of the rotary arm for the stepping switch. One preferred embodiment of the electrical counter employed may be that described in an article appearing in the March 1965 issue of Electromechanical Design page 15 entitled Single Decade Counter Provides Readout Facilities. In the embodiment taught in this patent, the counter-wheel is provided with a printed circuit arrangement which cooperates with a stationary printed circuit arrangement to form the stepping switch circuitry shown in schematic fashion in FIGURE 2 shown herein. It should be understood, however, that any suitable arrangement may be employed without departing from the scope of the instant invention.

In order to provide the alarm or lamp indication previously described with reference to FIGURE 1, a coincidence circuit is provided. This coincidence circuit is comprised of the leads 34–0 through 34–9 which electrically couple the associated terminals of rotary switch 28 and 33. For example, the "9" position terminals of switches 28 and 33 are coupled in a like manner. Rotary arm 32 is electrically coupled to ground potential 35 through a conductor 36, while rotary arm 27 is electrically coupled through conductor 37 to one terminal of a relay coil 38. The remaining terminal of this coil is coupled through conductor 39 to B+.

The relay coil armature is mechanically coupled through a linkage 40 to the rotary arm 41 of a switch 42 having two stationary contacts 43 and 44. Stationary contact 43 is coupled to one terminal of panel light 18 and stationary contact 44 is coupled to one terminal of panel light 19. The remaining terminals of panels lights 18 and 19 are coupled in common to a B+ supply. The rotary arm 41 is normally biased by suitable bias means 41a so as to be normally disengaged from stationary contact 44. The coincident circuit operates to indicate a coincidence condition when both rotary arms 27 and 32 occupy substantial identical positions. For example, when both rotary arms are in the "0" position, as shown in FIGURE 2, an electrical circuit is established from ground 35 through conductor 36, rotary arm 32, "0" terminal of switch 33, conductor 34–0 to "0" terminal of switch 28, rotary arm 27, conductor 37, relay 38 and conductor 39 to B+ supply. This electrical circuit energizes relay 38, causing movable contact arm 41 to be disengaged from contact 44 against the influence of bias means 41a and to make engagement with stationary contact 43. This establishes an electrical path from ground potential 45 through movable arm 41, stationary contact 42, and panel light 18 to B+. This is the lamp which indicates coincidence between incoming and outgoing counters, and hence indicates that the capacity of the level being monitored is full.

As a practical matter, incoming counter 14 cannot be advanced, since an indication that capaicty of the level being monitored is full instructs the operator to divert any vehicles from this level.

If a vehicle leaves the level being monitored, the outgoing sensing device will generate a pulse 29 to operate relay coil 30, causing rotary arm 32 to advance to switch position "1" of switch 33 so as to interrupt the electrical circuit previously described.

Figure 2A:
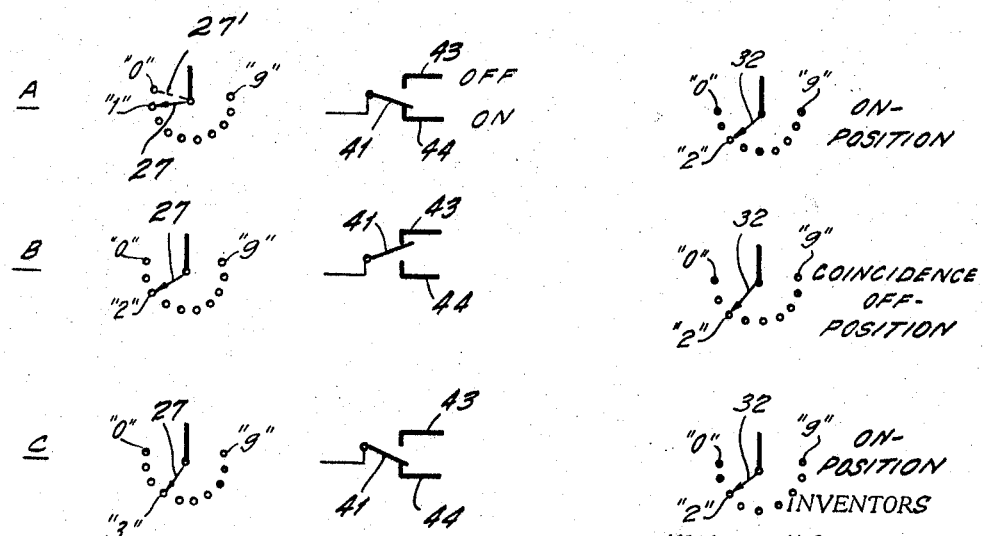
FIGURE 2a is a block diagram showing another application for the system of the instant invention.

FIGURE 2a shows some of the possible positions which the units position of the switches 28 and 33 can assume. In example A of FIGURE 2a, the rotary arm 32 is shown as being preset to the "2" position. Initially, the rotary arm 27 engages the "0" terminal position. In this position, there is no coincidence, so that movable arm 41 of switch 42 is biased into electrical engagement with stationary contact 44 by bias spring 41a, causing the available room lamp 19 to be lit. With the entry of one vehicle, the rotary arm of switch 28 is advanced from the dotted line position 27' to the solid line position 27 into engagement with the "1" contact position. Hence, coincidence is still not established. Movable arm 41 remains in engagement with stationary arm 44 to indicate that there is still available room for receiving a vehicle.

Moving to the example B, with the entry of another vehicle into the level being monitored, the rotary arm 27 makes engagement with the "2" contact position. Let it be assumed that no vehicles have departed from the level being monitored so that rotary arm 32 will remain in engagement with the "2" contact position, thus establishing the coincident circuit previously described. This moves movable arm 41 out of engagement with stationary contact 44 and into engagement with stationary contact 43 to light the capacity-full lamp 18.

Moving to the example C of FIGURE 2a, let it be assumed that another vehicle enters the level being monitored. This moves rotary arm into engagement with the "3" contact position. Assuming that no vehicles have departed from the level, rotary arm 32 remains in engagement with the "Z" contact position of switch 33 so that the coincident circuit will be disrupted, causing movable arm 41 to be disengaged from stationary contact 43 and to make engagement with stationary contact 44 so as to light the available room lamp 19. In the application where the level of a storage garage is being monitored, the position of example C is obviously an invalid one, and is to be avoided. However, there may be other applications in which the position of example C is a perfectly valid condition, and the system is thereby capable of assuming this position. Basically, however, the examples of FIGURE 2a show the manner in which coincidence is established as well as the two possibilities in which coincidence is disrupted. The position of example C may be a valid position, depending only upon the application to which the system is put.

FIGURE 3 shows an arrangement 45 which may employ the system of the instant invention. In a food processing activity, such as, for example, a restaurant in which it is desired to monitor the acknowledgment of an order after it is placed, it becomes possible, through the arrangement of the instant invention, to automatically control the heating unit. The arrangement 45 is comprised of a heating unit such as an oven, grill, or other like device, which accepts hot-dogs passed through the heating unit 46 by means of closed loop conveyor belt 47 moving the food items to be heated from the left toward the right. As one obvious manner of operation, the speed of conveyor belt 47 may be adjusted coordinate with the temperature of heating unit 46 so that the duration in which the food item contained within the heating unit 46 is sufficient to prepare the food item, such as, for example, a hot-dog.

As each order is received from a customer, a hot-dog 49 is placed upon the left-hand end of conveyor belt 47. In the present example, the system 10 is reset so that both counters provide zero readings, and in this example, it is not necessary to preset outgoing counter 15.

After setting the hot-dog 49 upon conveyor belt 47, the movement of conveyor belt 47 from the left toward the right causes the hot-dog to pass sensing device 20. This advances the incoming counter 14 by 1 unit causing the total in incoming counter 14 to be greater by 1 unit than the count of outgoing counter 15. In addition to providing energization for lamp 19, this condition may also be provided as an output indication at 48 which is coupled to heating device 46 for the purpose of energizing the device.

Let it be assumed that only one hot-dog 49 has been placed upon the conveyor belt 47. The lack of coincidence between incoming and outgoing counters 14 and 15, respectively, cause the lamp 19 to be energized and also energizes the heating unit 46. The hot-dog will then pass through the heating unit 46 and be sufficiently cooked. After a predetermined time interval, the hot-dog will pass out of heating unit 46 and pass by sensing device 21 so as to advance the count of outgoing counter 15. This again establishes a coincidence condition causing the lamp 18 to become deenergized, the lamp 19 to become energized, and the heating unit 46 to be turned off. It can be seen that the condition C of FIGURE 2a is a perfectly valid condition for this application. While the example given describes the passage of only a single hot-dog, it should be understood that the hot-dogs may occupy different phases such as being loaded onto the conveyor at 49, undergoing heating at 50, passing out of the oven at 51, or passing the sensing device 21 at 52. As each hot-dog passes sensing device 21, incoming counter 14 is advanced 1 unit per hot-dog passing the sensing device. As each hot-dog has been heated and passes sensing device 21, outgoing counter 15 is advanced 1 unit per hot-dog. Once coincidence again exists between counters 14 and 15, the heating unit 46 may be automatically turned off. While the arrangement 45 of FIGURE 3 refers specifically to hot-dogs, any other type of food may be treated. Also the oven may be replaced by a cutting device, a washing device, a liquid bath or any other operation which is adapted for receiving units to be so treated by a conveyor-type operation.

FIGURE 4 shows a coincidence circuit arrangement for use in systems wherein the incoming and outgoing counters have a capacity from 000 to 999. In this example the incoming counter 14 is provided with units, tens and hundreds, rotary switches 53, 54 and 55, respectively, and outgoing counter 15 is provided with units, tens and hundreds, rotary switches 56, 57 and 58, respectively. Associated terminals of rotary switches 53 and 56 are coupled through the ten conductors in group 59. In a like manner, associated terminals of switches 54–57 and 55–58 are coupled through the conductors in groups 60 and 61, respectively. The rotary arms 53a, 54a and 55a of the units, tens and hundreds incoming counter are shown set at a reading 951, while the rotary arms 56a, 57a, and 58a of the units, tens and hundreds outgoing counter switches are set to reflect a reading of 000. Considering this setting in the example shown in FIGURE 3, this would indicate that 951 food items have been fed into the processing unit and none of the food items have been removed from the processing unit 46. Assuming that no further food items are fed into the processing unit, as soon as all 951 items have passed by sensing device 21, the rotary arms 56a through 58a will be stepped to provide a conicidence reading of 951 so as to establish a conductive path through B+, conductor 62, rotary arm 58, the appropriate conductor of conductor group 61, rotary arm 55a, conductor 63, rotary arm 54a, the appropriate conductor of conductor group 60, rotary are 57a, conductor 64, rotary arm 56a, the approprate conductor of conductor group 59, rotary arm 53a, conductor 65, relay coil 38 (see also FIG. 2) and conductor 66 to ground potential 67. As previously described, relay coil 38 will operate switch 42, shown in FIGURES 2 and 2a to light the appropriate lamp in the same manner as was previously described. Thus, it can be seen that counters of any desired number of decades may be employed, and the electrical wiring between associated decades of the incoming and outgoing counters is quite simple. In order to establish the coincidence circuit, the actual number of decades employed depends only upon the needs of the user, and the system is applicable for use with any desired amount of decades.

FIGURE 5 shows a system arrangement 70 which may be employed in a storage garage of three levels (or, if desired, a storage garage on one level having three distinct sections or parking areas). The third, second and first levels, of floors of the storage garage are provided with incoming sensing devices 20, 20′ and 20″, respectively, and are provided with outgoing sensing devices 21, 21′ and 21″, respectively. Each of these devices are electrically coupled through suitable wiring means, to associated control panels 10, 10′ and 10″, respectively. To provide a still further level of information, the garage entrance and exit is provided with an incoming sensing device 20‴, and an outgoing sensing device 21‴ which are electrically coupled to a control panel 10‴. The control panels 10 through 10‴ may be conveniently arranged in one central location so as to permit reading of any and all devices by one simple glance.

The outgoing counter of each coutrol panel is preset to reflect the capacity of its associated level, while the garage capacity is preset in the outgoing counter of control panel 10‴. Thus, the operator can tell at a glance which floor of the storage garage is filled, and likewise which floor or floors still have available room for receiving vehicles. In addition therto, an indication is also available as to when the capacity for the entire garage has been achieved. When a vehicle enters through the main entrance to indicate that capacity has been achieved for the entire garage, the control panels 10 through 10″ may still nevertheless be examined to determine which of these levels may receive this final vehicle. As a vehicle departs the garage, the control panel 10‴ immediately indicates that room is available within the garage, and one of the control panels 10 through 10″ provides an indication of which level has available room. By subtracting the storage capacity for each level (which may be designated on a separate label, such at the label 22, shown in FIGURE 1) the total number of cars leaving the garage is known. By subtracting the total number of cars leaving the garage from the total number of cars entering the garage, which total is available at the incoming counter, the momentary storage capacity is known. The system is put into use simply by depressing the reste button for each control panel shown as 16 in FIGURE 1; presetting the storage capacity for each level at control panels 10 through 10″ by the counter set button array 17; and presetting the total garage capacity in the outgoing counter of control panel 10‴.

The schematic of FIGURE 6 is substantially the same as that shown in FIGURE 4, with the exception of conductor 63 being coupled between the rotary arm 55a and the rotary 57a, and the conductor 64 being connected between rotary arm 54a and rotary arm 56a. The operation of the circuit, however, is substantially identical to that shown in FIGURE 4. The additional circuitry shown in FIGURE 6 is comprised of the relay coils 53b through 58b for each of the rotary switches 53 through 58, respectively. The relay coils 53b through 55b are selectively coupled in an electrical series circuit through the transfer contacts 53c and 54c of the rotary switches 53 and 54, respectively. In a like manner, the relay coils 56b through 58b are selectively coupled into an electrical series circuit through the transfer contacts 56c and 57c of rotary switches 56 and 57, respectively. It should be noted that the dotted lines 72 and 73 symbolically represent the transfer arrangement between decades. The actual circuitry employed to obtain transfer is shown in FIGURE 8. The operation of the circuitry of FIGURE 6 is as follows:

Incoming counter 14 receives incoming pulses 23 at input terminal 70. As shown in FIGURE 6, the rotary arms 53a through 55a are all in the "0" position indicating that the device has just been reset. As soon as the first nine vehicles have entered into the storage garage, the rotary arm 53a will occupy the dotted line position 53a' engaging the "9" contact position. Since the next incoming vehicle should provide a count of 10, this means that the rotary arm 53a should be stepped to engage the "0" contact position and the rotary arm 54a should be stepped to engage the "1" contact position. In order to achieve this operation, a mechanical coupling 72 exists between switch 53 and its transfer contact 53c. As soon as the "9" contact position is reached, the transfer contact 53c is closed, establishing a series electrical path from input terminal 70 through coil 53b and closed transfer contact 53c to coil 54b. Transfer contact 54c remains open at this time so that no entrance pulses are fed to coil 55b. Transfer contact 54c will remain opened until a reading of 99 is achieved in incoming counter 14, causing the mechanical coupling 73 between switch 54 and its transfer contact 54c to close contact 54c. Thus, when the next entrance pulse 23 is impressed upon input terminal 70, each of the coils 53b, 54b and 55b will become energized, stepping rotary arms 53a and 54a to their associated "0" contact positions and stepping rotary arm 55a to its "1" contact position with the switches of outgoing counter 15 being set to reflect a capacity of 940 vehicles. It is obvious (assuming that no vehicles leave the garage) that coincidence will not occur until incoming counter 14 registers a like reading of 940. The above arrangement is quite simple, and replaces a more costly arrangement requiring an add-subtract counter (i.e., a reversible counter) having a zero read-out position and a manual preset feature, in addition to a totalizer for incoming and a totalizer for outgoing vehicles. The instant invention employs only two counters, neither of which is of the reversible type, to perform all of the functions capable of prior art devices requiring three counters, one of which must be of the reversible type.

There may be certain applications in which it is desired to provide a print-out feature in order to produce a daily (or weekly, or monthly) record of the number of vehicles serviced or food items processed for cost accounting or other purposes. FIGURE 7 shows an embodiment 75 which may be employed to provide this function. While the circuit arrangement 75 is shown for only one decade of the incoming and outgoing counters, it should be obvious that the print-out deivce may be employed for a larger number of decade positions, depending only upon the needs of the user. Like elements as between the circuitry of FIGURES 2 and 7 are designated with like numerals. For example, the incoming and outgoing counters 14 and 15 are provided with rotary switches 28 and 33, respectively.

The conductors 34–0 through 34–9 coupling associated switch positions between switches 28 and 33 are disconnected from one another and replaced by the switching arrangement 76. Since the switching arrangement is identical for each decimal position, only that arrangement for the "9" position will be described herein, it being understood that the switching arrangement for all the remaining decimal positions are identical in both configuration and operation. The switching arrangement for the decimal "9" position is comprised of a jumper conductor 77 and two printing output contacts 78 and 79. A first movable contact arm 80 is arranged to selectively make engagement with either bridging conductor 77 or contact 78. A second movable contact arm 81 is arranged to make selective engagement either with bridging conductor 77 or contact 79. The movable arm 80 is mechanically coupled to a linkage designated by dashed line 82 to a movable contact 83 which is normally biased to the position shown in FIGURE 7 so as to engage stationary contact 84. This places the rotary arm 27 of switch 28 into its normal electrical circuit, as shown in FIGURE 2, so as to be electrically connected with the relay coil 38 of FIGURE 2.

Likewise, the movable arm 81 is coupled to a mechanical linkage designated by the dashed line 85 to a movable contact 86 which is normally biased into engagement with stationary contact 87 to electrically connect rotary arm 32 to ground potential 35, as shown in FIGURE 2.

A mechanically operable print-out relay 88 is provided to initiate the print opeartion. Print-out relay 38 is mechanically coupled to mechanical linkages 82 and 85 through mechanical linkages 89 and 90, shown in FIGURE 7 by dotted lines. Depression of the print button 88 simultaneously moves the movable arms 83 and 86 out of engagement with the "normal use" contacts 84 and 87 and into engagement with the print contacts 91 and 92, respectively. Also, simultaneously therewith, depression of print relay 88 moves movable arms 80 and 81 out of engagement with bridging conductor 77, and into engagement with the print-out contacts 78 and 79, respectively. It should also be understood that the movable arms for the "0" through the "8" switch positions will be moved out of engagement with their bridging conductors and into engagement with their print-out terminals. The print position terminals 91 and 92 may be, for example, coupled to a suitable B+ supply. The print-out terminals 78 for each of the decimal positions of incoming counter 14 are coupled to a print hammer solenoid 78a so as to urge a typehead 78b into engagement with ribbon 93 to make an impression upon paper document 94. In a like manner, print-out conductor 79 is coupled to a print-hammer solenoid 79a to drive print-head 79b into engagement with ribbon 93 to form an impression upon paper document 94. It should be clearly understood that the location of the typeheads may be arranged in separate columns on the document so as to clearly distinguish the reading of the incoming register 14 from the reading of the outgoing register 15. Also, the coils and typeheads have only been shown for the "9" position for purposes of simplicity of the figure, it being understood that the remaining decimal positions are likewise provided with suitable print means.

In order to obtain print-out, an electrical circuit must be completed through the switches 28 and 33 of the incoming and outgoing registers 14 and 15, respectively. For example, with the rotary arm 27 in the position shown in FIGURE 7 and with the print button 88 being depressed, an electrical circuit is established from B+ through contact 91, movable arm 83, rotary arm 27, switch position "8," conductor 34–8, movable arm 80 and contact 78 to the appropriate print-hammer relay and typehead (not shown) so as to print out character "8" indicating a reading in the incoming register 14 of 8. Obviously, only one decimal character will be printed for each decade position.

In a like manner, the reading of the outgoing register 15 is printed through the establishment of an electrical circuit from B+ through terminal 92, movable arm 86, rotary arm 32, contact position "7," switch 33, conductor 34–7, movable arm 81 and contact 79 to the type-hammer coil and typehead (not shown) so as to print the decimal character "7" on the paper document 94, indicating a reading of "7" in outgoing register 15.

Release of the print button 88 automatically resets the circuitry 75 to the normal use posiiton, restablishing the coincidence circuitry which is substantially identical to that shown in FIGURE 2. It should be obvious that the circuitry of FIGURE 7 may be employed for each decade position of the incoming and outgoing counters to print the total reading of each counter. Thus, through the use of the arrangement of FIGURE 7, it is a relatively simple matter to provide a printed document at the end of each day, week, or month, or other period of measurement as to the number of incoming and outgoing cars or processed items. If desired, the mechanically operated print button 88 may be replaced by an automatically operated device which may be equipped with a timer to print the readings of the incoming and outgoing counters 14 and 15, respectively, at the end of every 24-hour period, or one week period, or one month period, if desired. Also, the individual print hammer may be replaced by a type-wheel containing the ten decimal characters around its periphery.

FIGURE 8 shows a monitoring circuit 100 having D.C. operation with A.C. (half-wave) reset in which the switch portion 53–55 are substantially identical to that shown in FIGURE 6. A 35 volt A.C. source is coupled across input terminals 102 and 103, and a 24 volt D.C. source 104 is coupled between ground potential 105 and terminal 106 so that terminal 106 is −24 volts D.C. relative to ground potential 105. The system is turned ON and OFF by a toggle switch $S_{1b}$, and is further operated between the ON and RESET positions by a toggle switch $S_{1a}$ having contact arms 107, 108 and 109 mechanically coupled through a linkage 110 so as to be simultaneously movable upon the actuation of toggle switch $S_{1a}$.

Let it be assumed that it is desired to reset the incoming counter 14. Toggle switch $S_{1a}$ is then moved vertically downward from the position shown in FIGURE 8 to establish the following connections:

Movable arm 107 electrically connects terminal 102 to the cathode terminals of diodes D1, D3 and D5; movable arm 108 electrically connects terminal 103 to one terminal of the switch relay coils 53b, 54b and 55b; movable arm 109 is disconnected from conductor 111 which is coupled to terminal 106 through the OFF-ON toggle Switch $S_{1b}$. Considering just the units position of incoming counter 14, an A.-C. circuit is set up from A.-C. source 101, terminal 103, switch arm 108, relay coil 53b, normally closed reset movable arm 53d, diode D1, switch arm 107, and terminal 102 to the A.-C. source 101. During each half-cycle of the sinusoidal waveform (of appropriate polarity), relay coil 53b becomes energized causing switch arm 53a to be advanced by one step until it reaches the "0" position contact. At this time, the normally closed reset movable arm 53d is automatically opened to disrupt the A.-C. path, and hence to prevent the rotary arm 53a from stepping any further. A substantially identical A.-C. circuit path is established through each of the switch relay coils 54b and 55b causing their associated rotary arms 54a and 55a to be reset to the "0" position, at which time their associated reset movable arms 54d and 55d, respectively, automatically open to prevent the rotary arms 54a and 55a from stepping beyond the "0" contact position. It can clearly be seen that the reset operation will occur within a time duration which does not exceed ⅙ of a second (assuming a 60 cycle input signal).

Since the outgoing counter 15 is provided with manually settable means, such as the pushbutton array 17 shown in FIGURE 1, it is not necessary to provide the reset circuitry as shown for the counter 14. If desired, such a fast reset can be provided.

After having reset incoming counter 14 in the manner set forth above, the outgoing conuter 15 is then present either to zero or to the capacity desired (depending upon the particular application for which the system is being used, and now is ready for use.

In the arrangement of FIGURE 8, advancing pulses for incoming register 14 are represented by the mechanical pushbutton switch $S_2$ which may be replaced by electronic switch means or any other suitable means for advancing the incoming counter.

After the reset operation, toggle switch $S_{1a}$ is moved to the ON position which is shown in FIGURE 8, causing the diodes D1, D3 and D5 to be disconnected from terminal 102. Switch arm 108 couples ground potential 105 to one terminal of each of the relay coils 53b, 54b and 55b and disconnects these terminals from the other A.-C. terminal 103. Switch arm 109 electrically couples conductor 112 to the negative D.-C. terminal 106.

When the first entering item is detected, the pushbutton switch $S_2$ is depressed, establishing an electrical path from D.C. voltage source 104 through negative D.C. terminal 106, closed toggle switch $S_{1b}$, conductor 111, closed switch arm 109, closed pushbutton switch $S_2$, and relay 35b to switch arm 108 and ground potential 105. This causes energization of relay coil 53b to advance the rotary arm 53a from the "0" position to the "1" position. As each incoming item is detected, the above operation is repeated until rotary arm 53a arrives at the "9" position. Immediately after arriving at this position, the mechanical arrangement within the counter releases the transfer contact 53c and places it under control of relay coil 53b. Upon receipt of the next closure condition, when the tenth incoming item is detected, pushbutton $S_2$ is depressed causing relay coil 53b to be energized. This steps the movable arm 53a from the "9" switch position to the "zero" position, and simultaneously closes the transfer contact arm 53c to establish an electrical path from conductor 112 through closed contact 35c, diode D2 and relay coil 54b to ground potential 105. The energization of relay coil 54b will cause its switch rotary arm 54a to move from the "0" position to the "1" switch position.

As a logical extension of the above operation, the transfer contact arm 54c will be conditioned to operate under control of relay coil 54b when energized as soon as the reading 99 is lodged in incoming counter 14. Thus, upon detection of the 100th incoming item and depression of pushbutton S, rotary arms 53a and 54a will be stepped from their "9" position to their "0" position. Rotary arm 55a will simultaneously be stepped from its "0" position to its "1" position. The series connected resistor-capacitor combinations $R_1$–$C_1$ through $R_3$–$C_3$ are provided for the purpose of compensating for arc suppression. Diodes D2 and D4 block A.C. from operating the relays 53b–55b during reset and at the time that the transfer contacts are closed.

In the case of outgoing counter 15, each time an outgoing item is observed, the pushbutton $S_3$ is depressed to advance the total by one unit. Closure of pushbutton $S_3$ establishes an electrical path from negative D.C. terminal 106 through closed pushbutton $S_{1b}$, conductor 113, closed pushbutton $S_3$, relay coil 56b and conductor 114 to ground potential 105. Each time pushbutton $S_3$ is momentarily depressed, relay coil 56b becomes energized to advance rotary arm 56a one step. As soon as rotary arm 56a is advanced to the "9" position, the transfer contact 56c is placed under control of relay coil 56b and is momentarily closed at the tenth closure of pushbutton $S_3$ to establish a current path through relay coil 57b. Thus, upon closure of pushbutton $S_3$ for the tenth time, relay coil 56b is energized to move rotary arm 56a from position "9" to position "0" and relay coil 57b is energized to advance its associated rotary arm from position "0" to position "1." As a logical extension, this operation will continue until counter 15 contains a reading of 99 at which time transfer contact 57c will be enabled to be placed under the opreation of relay coil 57b so that, upon the 100th closure of pushbutton $S_3$, all three relay coils 56b, 57b and 58b will be energized, moving rotary arms 56a and 57a from their "9" positions to their "0" positions and moving rotary arm 58a from its "0" position to its "1" position.

Coincidence is detected in the same manner as was previously described when identical readings appear in both incoming and outgoing counters, establishing an electrical circuit from negative D.C. terminal 106 through closed toggle switch $S_{1b}$, conductor 115, switches 53–58 and relay coil 38 to conductor 114 which returns to ground potential 105. This moves relay arm 41 out of engagement with its stationary contact 44 and into engagement with its stationary contact 43 to establish a conductive path from negative D.C. terminal 106, closed toggle switch $S_{1b}$, conductor 113, red lamp 18, stationary contact 43, movable contact arm 41 and conductor 114 to ground potential 105. In the case where coincidence between incoming and outgoing registers is not present, movable arm 41 is released from control of relay 38 (now deenergized) so that its biasing means 41a establishes the electrical path referred to immediately above through the green lamp 19, in place of the red lamp 18, to provide an indication that the capacity condition has not been reached, or in another application, to provide an indication that the processing apparatus (see element 46 of FIGURE 3) should be turned ON. The resistor capacitor series circuits $R_4$–$C_4$ through $R_6$–$C_6$ are provided to compensate for arc suppression due to contact chatter in the same manner as previously described.

It can, therefore, be seen from the foregoing description that the instant invention provides a simple monitoring system to monitor any one of a variety of operations and which is basically comprised of a pair of counters each having a rotary-type stepping switch associated with each decade position of the counter wherein a simple series-type coincident circuit is provided, whch circuit series connects every decade of the incoming and outgoing counters to produce a coincidnece signal when the counter readings are identical to produce a second signal when noncoincidence is present, as well as providing two visually observable readings indicating the number of incoming and outgoing items processed to thereby provide for either manual or automatic monitoring of a variety of processing or handling operations. This simplified arrangement replaces the need for a system employing a bidirectional counter and second and third totalizing counters which would otherwise be required to perform the functions described herein, thereby greatly reducing both the number of components, circuit complexity and, hence, overall cost for such a system.

Figure 9:
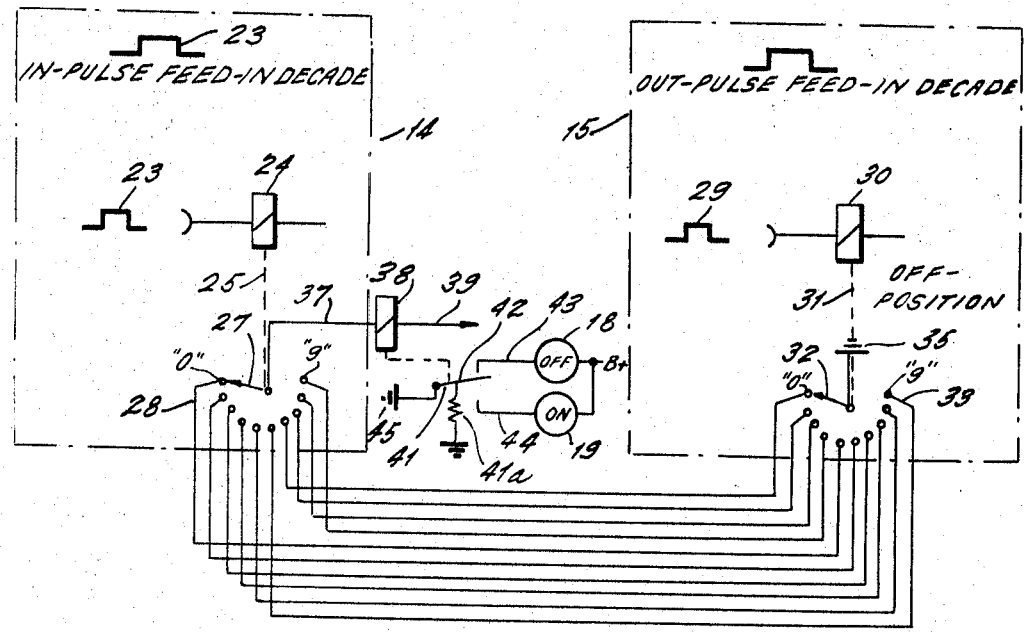
FIGURE 9 is a schematic diagram of an alternative embodiment for the scheme of FIGURE 2.

FIGURE 9 shows an alternative embodiment for the scheme of FIGURE 2. In FIGURE 2 the "out pulse" switch 33 must be preset to a particular position after a reset operation.

By wiring the output terminals between stepping switches 28 and 33 in the manner shown in FIGURE 9, presetting of the switch occurs automatically and simultaneously with a reset operation.

For example, let it be assumed that it is required that six items 50 (see FIGURE 3) be in the oven 46 (or other processing device) to assure proper utilization of device 46, and that this amount will never vary. Terminals of rotary switch 28 are then wired to terminals of rotary switch 33 in the following manner:

| From terminal of switch 28 | To terminal of switch 33 |
|---|---|
| "6" | "0" |
| "7" | "1" |
| "8" | "2" |
| "9" | "3" |
| "0" | "4" |
| "1" | "5" |
| "2" | "6" |
| "3" | "7" |
| "4" | "8" |
| "5" | "9" |

Items 50 to be processed are fed into device 46 causing switch 28 to advance its count. Items 50, which have been processed cause switch 33 to advance its count. Let it be assumed that eight (8) items are fed into device 46. Switch arm 27 of switch 28 makes contact with terminal "8." Let it now be assumed that the items 50 to be fed into device 46 are depleted. As each item 50 leave device 46. At this time, there is coincidence (see 32 of switch 33 engages contact "2" when two items 50 leave device 46. At this time, there is conicidence (see chart above) indicating that the system should be shut off and/or that a warning light be lit to indicate this condition. This arrangement completely avoids the need for operating the manual preset button 17 (see FIGURE 1) each time the monitoring device is reset.

The arrangement of FIGURE 9 makes the visual readout of counter 15 (see FIG. 1) meaningless. However, this presents no problem in the case where a visual readout is not required, since the warning light and/or system halt functions are nevertheless being performed. If a visual readout is required the number wheel of the outgoing counter may be modified to automatically preset to the desired number.

Figure 10:
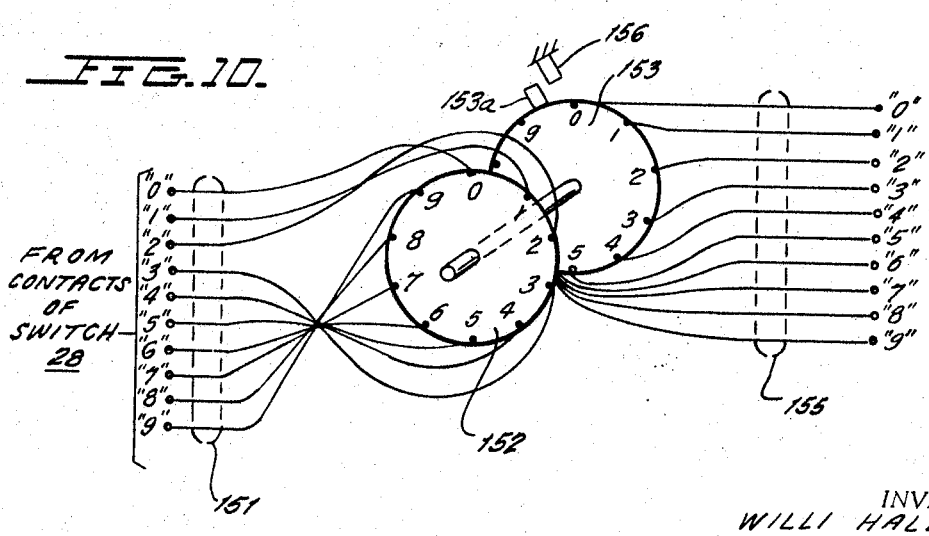
FIGURE 10 shows an alternative preset wiring scheme which may be employed in place of the wiring scheme of FIGURE 9.

As another alternative, the automatic preset obtained by the wiring scheme may be made adjustable by providing a switch means 150 shown in FIGURE 10. A group of ten lead wires 151 are electrically coupled at one end to the contacts of rotary switch 28. The other end of each wire is group 150 is coupled to a like number terminal on stationary switch member 152. Switch members 152 and 153 are mounted upon a shaft 154 and urged in pressure contact with one another. Switch member 153 is free to rotate about shaft 153 relative to switch member 153. Each switch member is provided with ten contacts which are selectively engageable to permit any automatic preset value desired. This arrangement completely avoids the necessity of removing permanent wiring connections and rewiring for a new preset value. In order to prevent undue twisting of the wire group 155 connected between the contacts of switch member 153 and the contacts of rotary switch 33, a projection 153a is provided on switch member 153 which cooperates with a stop 156 to limit the rotation of switch member 153 to only one revolution.

Although there has been described a preferred embodiment of this novel invention, many variations and modifications will now be apparent to those skilled in the art. Therefore, this invention is to be limited, not by the specific disclosure herein, but only by the appended claims.

What is claimed is:

1. Means for monitoring a handling operation to provide an immediate indication of the state of incoming and outgoing items being handled comprising:
    first means for providing an indication of the number of incoming items;
    second means for providing an indication of the number of outgoing items;
    third means having a first and a second state for indicating a state of inequality and equality, respectively, between the indicated number of items registered by said first and second means;
    said third means including fourth means normally maintaining said third means in said first state;
    fifth means coupled between said first, second means and third means;
    said fifth means including means operating said third means to said second state against the influence of said fourth means when there is equality between the number of items registered by said first and second means.

2. The device of claim 1 further comprising print-out means coupled between said multi-position switches;
    said print-out means having a first state permitting normal use of said system and a second state for printing out the contents of at least one of said first and second means.

3. The device of claim 1 wherein said first means is further comprised of counter means for developing a visually observable count of the number of incoming items handled.

4. The device of claim 3 further including means for resetting said counter means.

5. The device of claim 1 wherein said first and second means further include first and second counter means, respectively, for developing a visually observable count of number of incoming and outgoing items, respectively, processed by said handling opeartion.

6. The device of claim 5 wherein second counter means is further comprised of means for manually presetting said second counter to a predetermined total preparatory to utilization of said device.

7. The device of claim 1 wherein said first and second means are each further comprised of at least one multi-position switch means having a movable arm advancing one position as each item is observed;

said fifth means comprising conductor means coupling associated positions of the switch means.

8. The device of claim 7 further comprising a power source; said third means being comprised of first and second indicating lamp means; third switch means normally biased to couple said power source to one of said lamps;

relay means coupled in series fashion with one of said multi-position switch means being energized when the multi-position switch means of said first and second means occupy like positions to operate said third switch means coupling said power source to the other of said lamps.

9. The device of claim 1 further comprising print-out means coupled between said first and second means;

said print-out means having a first state permitting normal use of said system and a second state for printing out the contents of at least one of said first and second means.

10. The device of claim 1 further comprising print-out means coupled between said first and second means;

said print-out means having a first state permitting normal use of said system and a second state for printing out the contents of both of said first and second means.

11. A system for monitoring a process in which it is desired to ascertain the flow of items entering and leaving the process comprising:

first sensing means for developing a signal for each item entering the process;

second sensing means for developing a signal for each item leaving the process;

first and second counters driven by said first and second sensing means, respectively;

each of said counters including visually observable totalizing means having at least one decade position;

a multi-position switch for each decade of each of said counters driven by its associated decade position totalizer means;

each multi-position switch including ten contact positions and a rotary arm driven by its associated totalizer means for sequentially engaging said contact positions;

plural conductive means coupling like positions of the first and second counter switches;

a power source and a relay coil coupled in series with one of said rotary arms;

a two-position switch controlled by said relay coil assuming a first position when said relay coil is deenergized and a second position when said relay coil is energized;

first lamp means coupled to said two-position switch being energized when said two-position switch is in said first position.

12. The system of claim 11 further comprising second lamp means coupled to said two-position switch being energized when said two-position switch is in said second position.

13. The system of claim 11 further comprising means for resetting one of said first counters to a zero reading.

14. The system of claim 11 further comprising manual seting means for seting one of said counters to any desired reading.

15. A system for monitoring a process in which it is desired to ascertain the flow of items entering and leaving the process comprising:

first sensing means for developing a signal for each item entering the process;

second sensing means for developing a signal for each item leaving the process;

first and second counters driven by said first and second sensing means, respectively;

each of said counters including visually observable totalizing means having at least one decade position;

a multi-position switch for each decade of each of said counters driven by its associated decade position totalizer means;

each multi-position switch including ten contact positions and a rotary arm driven by its associated totalizer means for sequentially engaging said contact positions;

plural conductive means coupling different contact positions of the first and second counter switches;

a power source and a relay coil coupled in series with one of said rotary arms;

a two-position switch controlled by said relay coil assuming a first position when said relay coil is deenergized and a second position when said relay coil is energized:

first lamp means coupled to said two-position switch being energized when said two-position switch is in said first position.

16. The device of claim 15 wherein said plural conductive means includes adjustable switch means for altering the coupling between the contact positions of said first and second counter switches to provide automatic preset of one of the first and second counter switches whenever said system is reset.

References Cited

UNITED STATES PATENTS

| | | | |
|---|---|---|---|
| 3,109,157 | 10/1963 | Bolton | 340—39 |
| 3,109,926 | 11/1963 | Bolton. | |
| 3,110,010 | 11/1963 | Smith. | |
| 3,166,732 | 1/1965 | Ljungman. | |
| 3,322,940 | 5/1967 | Barker. | |
| 3,397,306 | 8/1968 | Auer | 235—92 X |

MAYNARD R. WILBUR, *Primary Examiner.*

G. J. MAIER, *Assistant Examiner.*

UNITED STATES PATENT OFFICE
CERTIFICATE OF CORRECTION

Patent No. 3,441,719                                     April 29, 1969

Willi Haller et al.

It is certified that error appears in the above identified patent and that said Letters Patent are hereby corrected as shown below:

Column 1, line 2, "example," should read -- example. --; line 25, "and" should read -- an --; same line 25, "fault" should read -- full --; line 26, "present" should read -- preset --. Column 2, line 23, "moinitoring" should read -- monitoring --; line 27, "porvides" should read -- provides --; line 65, "attenmpt" should read -- attempt--. Column 3, line 42, "uotgoing" should read -- outgoing --; line 63, after "control," insert -- warehousing control, --; line 72, "momenary" should read -- momentary --. Column 5, line 15, "an" should read -- at --. Column 7, line 59, after "tact" and before "44" insert -- 43 and to engage stationary contact --. Column 10, line 51, "reste" should read -- reset --. Column 13, line 62, "conuter" should read -- counter --; same line 62, "present" should read -- preset --. Column 14, line 9, "35b" should read -- 53b --. Column 15, line 71, "leave device 46. At this time, there is coincidence (see" should read -- leaves device 46, switch 33 advances by one. Switch arm --. Column 16, line 17, "is" should read -- in --; same line 17, "number" should read -- numbered --; line 21, before "shaft" insert -- its --; same line 21, cancel "153", second occurrence; line 22, "153" should read -- 152 --; line 75, "opeartion" should read -- operation --. Column 17, line 1, after "wherein" insert -- said --. Column 18, line 10, "seting", both occurrence, should read -- setting --.

Signed and sealed this 7th day of July 1970.

(SEAL)
Attest:

EDWARD M. FLETCHER, JR.                     WILLIAM E. SCHUYLER, JR.
Attesting Officer                               Commissioner of Patents